Jan. 24, 1961      C. T. DAVENPORT      2,968,955
GIMBAL SYSTEM FOR VERTICAL INDICATORS
Filed Nov. 19, 1956      2 Sheets-Sheet 1
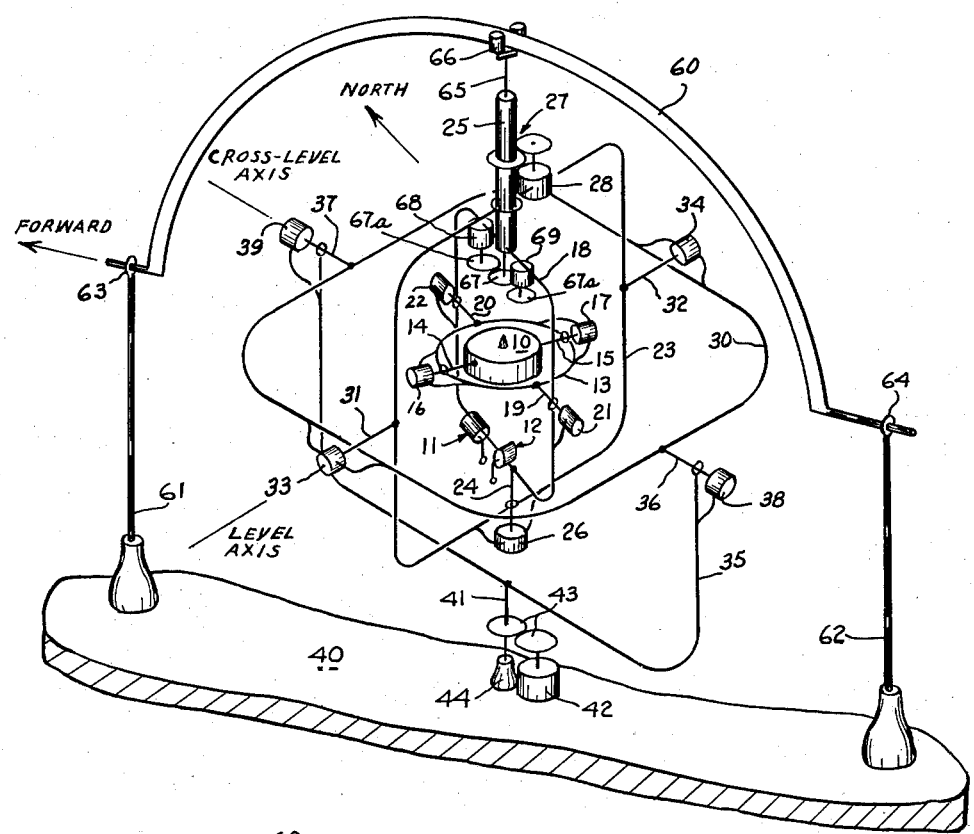
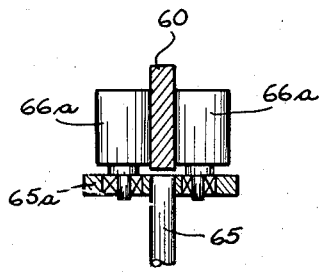
Fig. 1.
Fig. 3.
INVENTOR.
CHARLES T. DAVENPORT
BY
*Raymond A. Paquin*
ATTORNEY.

INVENTOR.
CHARLES T. DAVENPORT
BY
ATTORNEY.

United States Patent Office 2,968,955
Patented Jan. 24, 1961

2,968,955

GIMBAL SYSTEM FOR VERTICAL INDICATORS

Charles T. Davenport, Manhasset, N.Y., assignor to American Bosch Arma Corporation, a corporation of New York Filed Nov. 19, 1956, Ser. No. 623,054

7 Claims. (Cl. 74—5.8)

The present invention relates to gyroscopic devices and has particular reference to stable verticals.

Stable elements or stable verticals are normally employed in gun fire control or other stabilization systems. Such stabilization may be made about roll and pitch axes or about level and cross level axes. The U.S. patent application S.N. 445,052, filed July 22, 1954, and now Patent No. 2,879,669, describes a means for compensating pendulum indications for accelerations other than gravity. The means there described requires orientation of the sensitive axes of the pendulums with respect to the geographic meridian. In a roll and pitch gimbal system, the control of pendulum orientation is relatively simple since the relative motion between the azimuth and pitch gimbals represents own ship's course.

In a level and cross-level gimbal system, however, the angle between the azimuth and level gimbal frames represents true target bearing, that is, own course plus relative target bearing. The customary method of handling this situation is to compute relative target bearing by means of a chain of four resolvers and add to it the own course to obtain a quantity equal to true target bearing. The angle between the azimuth and level gimbals is then servo controlled according to this quantity.

The system of the present invention provides a direct method of azimuth frame control from own course only, without the auxiliary computing resolver chain, by the simple addition of a roll reference bail carrying a sliding carriage having attached to it a shaft which extends between the carriage and the azimuth frame and passes through the azimuth frame. The roll reference bail orients the carriage into the vertical plane passing through the fore and aft axis of the craft, and the angle between the azimuth frame and the carriage is therefore equal to own course (when the azimuth frame is aligned with the meridian) and can be used to control the orientation of the azimuth frame by servo means.

For a more complete understanding of the invention, reference may be had to the accompanying diagrams in which:

Fig. 1 is a schematic view of the mechanical configuration of the gimbal system;

Fig. 3 shows a possible carriage structure in sections.

Figure 2:
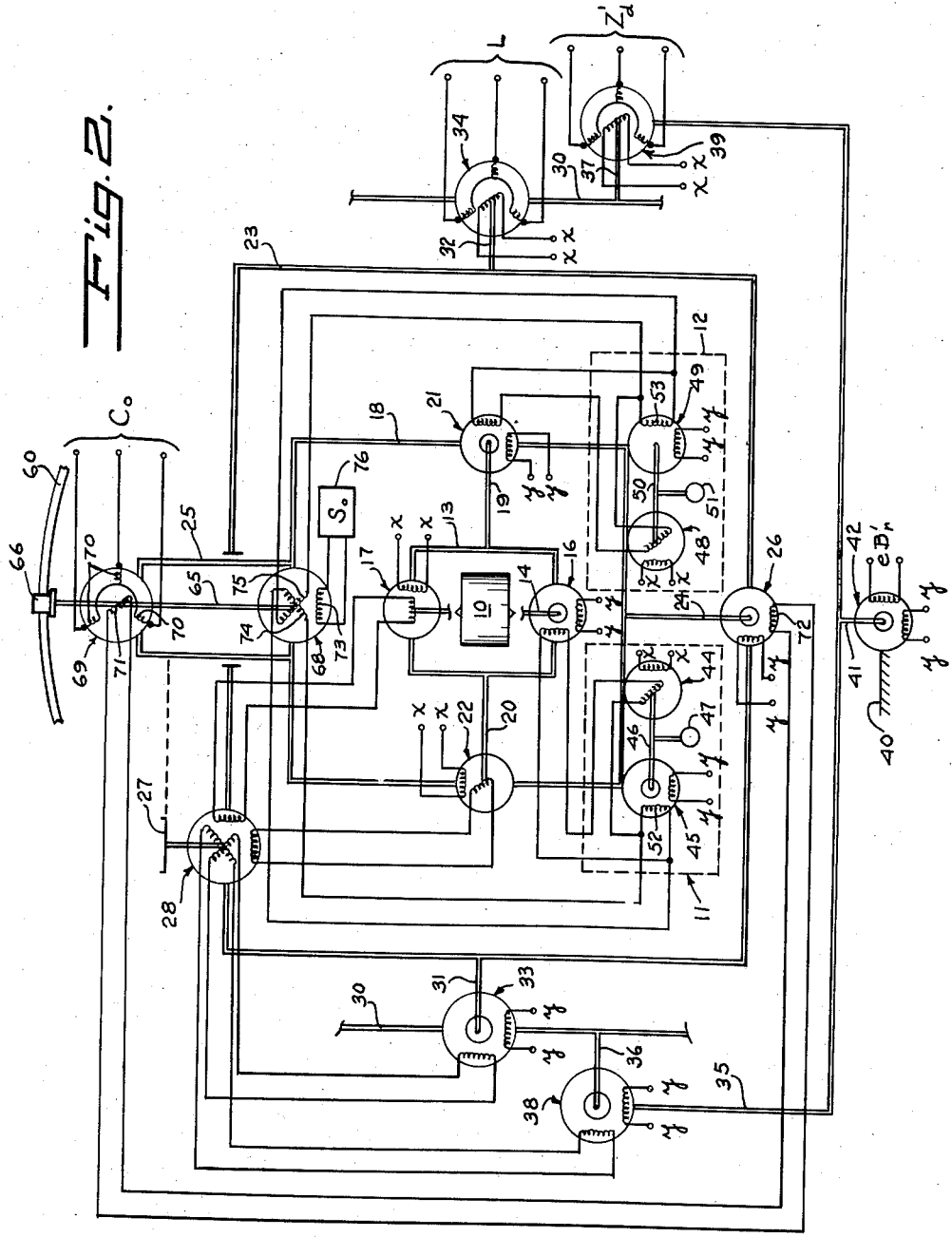
Fig. 2 is a schematic diagram showing the electrical connections between various elements of Fig. 1.

Referring now to Fig. 1, there is shown a stable element using the present invention which may be employed in stabilization systems where the reference frame is stabilized about level and cross level axes. Such systems are commonly used in gun fire control devices in a manner such as described in U.S. Patent 2,463,687, for "Instrument Stabilizing Mechanism," for example.

The vertical spin axis gyroscope 10 establishes a vertical reference in conjunction with the vertical sensing devices 11, 12 which are made insensitive to acceleration forces other than gravity by the means described in U.S. patent application 445,052, filed July 22, 1954, for "Vertical Sensing Device" by Joseph Statsinger and assigned to the assignee of the instant application. The means there described requires that the vertical sensing devices 11, 12 be oriented in a certain manner with respect to the geographical meridian and for this purpose the angle between the vertical sensing devices and the meridian must be accurately and continuously determined. The present invention comprises a novel method of obtaining the required orientation in a simple and direct manner, as will be described.

In the particular embodiment shown, a vertical spin axis gyroscope 10 is suspended in gimbal ring 13 by the horizontal shafts 14, 15 which, respectively, are connected operatively to a torque motor 16 and a pickoff device 17, carried by the gimbal ring 13. The gimbal ring 13 is suspended in an azimuth frame 18, by horizontal shafts 19 and 20, which are perpendicular to shafts 14, 15 and, respectively, are connected operatively to a torque motor 21 and a pickoff device 22, carried by the azimuth frame 18.

The azimuth frame 18 is mounted for rotation about a vertical axis in the level frame 23, and is supported therein by a lower shaft 24, and an upper tubular shaft 25. The lower shaft 24, is operatively connected to motor 26 which is carried by the level frame 23, while the upper shaft is operatively connected, through gearing 27, to the resolver 28, which is carried by the level frame 23.

The level frame 23, is supported in the cross-level gimbal ring 30 by horizontal shafts 31, 32 which, respectively, are operatively connected to the follow-up motor 33 and synchro transmitter 34. The cross level gimbal ring 30 is supported in the frame 35 by the nominally horizontal shafts 36, 37 (actually parallel to the deck) which are perpendicular to shafts 31, 32 and which are operatively connected to the follow-up motor 38, and synchro transmitter 39, respectively carried by the frame 35. Frame 35 is supported on the unstable deck 40 by the shaft 41, which is journaled in a bearing 44, so that the frame 35 is rotatable on the deck 40. Servo motor 42 is mounted on deck 40 and is operatively connected to shaft 41 through gearing 43 to position frame 35 with respect to the fore and aft axis of the craft according to the director train angle of a target.

A device of the type outlined in the preceding paragraphs is used to determine the level and cross-level angles and to transmit these angles to remote stations for use in gun fire control, for example. The electro mechanical units of Fig. 1 are electrically interconnected as shown in Fig. 2, and operate as will be described. Fig. 2 is a schematic wiring diagram, from which such necessary circuit elements as amplifiers, phase shifters, scaling elements, and the like have been omitted in the interest of simplicity. Those skilled in the art will recognize the necessity for these elements without further explanation. With reference to Fig. 1, the usual gearing, thrust bearings, slip rings, and other mechanical elements are generally omitted in the interest of simplicity, but, again, the actual physical construction will be clear to those skilled in the art without detailed explanation.

The erection of the axis of the gyroscope 10 into the vertical is accomplished in the usual fashion. Thus, the axis of shafts 24, 25 of the azimuth frame 18 is made to align itself with the spin axis of the gyro 10 by the action of the pickoffs 17 and 22 and follow-up motors 33 and 38, with resolver 28 being interposed between the pickoffs and motors to resolve the relative displacements of the gyro 10 with respect to the gimbal ring 13 and frame 18 into relative displacements of the gyro 10 with respect to gimbal ring 30 and frame 23. When the axis of shafts 24, 25 coincides with the gyro 10 spin axis, the outputs of the vertical sensing devices 11 and 12 are indications of the displacement of the spin axis of gyro 10 from the true vertical. The output of sensing device 11 applies a torque to gyro 10 about shaft 14 by means of torque motor 16 while the output of sensing device 12 applies a torque to gyro 10 about shaft 19 by means of torque motor 21 thereby causing the gyroscope 10 to precess into the vertical in the now familiar manner. The angular displacement between gimbal ring 30 and frame 23 is the level angle and is electrically transmitted to remote locations by the synchro transmitter 34, and the angular displacement between gimbal ring 30 and frame 35 is the cross level angle and is electrically transmitted to remote locations by the synchro transmitter 39.

The vertical sensing device 11 includes a rotary pickoff device 44, and a torque motor 45, the rotors of which are operatively connected together by shaft 46. A pendulum 47 is also connected to shaft 46. The vertical sensing device 12 is similar to device 11 and includes a rotary pickoff device 48, a torque motor 49, a shaft 50, and a pendulum 51. The pendulum 47 is adapted to swing in the vertical plane containing shafts 14, 15 while pendulum 51 is adapted to swing in the vertical plane containing shafts 19, 20.

The aforementioned patent application S.N. 445,052 contains a complete theoretical analysis of the vertical sensing device and for that reason the operation of the vertical sensing device will be briefly stated, without any attempt to substantiate the various electrical connections with theory. As shown in that patent application, the sensitive axes of the pendulums 47 and 51 must be maintained in constant orientation with, or rotated at a known rate with respect to the geographical meridian, depending on the speed of the craft carrying the pendulums. The control field winding 52, of the torque motor 45, is energized by a voltage from resolver 68, which is proportional to $So \sin (Co+\theta)$ as will be shown, and the control field winding 53 of torque motor 49 is energized by another voltage from resolver 68, which is proportional to $So \cos (Co+\theta)$ as will be shown, where $So$ is the speed of own craft, $Co$ is the course of own craft and $\theta$ is the angle between the meridian and the sensitive axis of pendulum 47. For slowly moving craft such as surface vessels, $\theta$ is zero, while for rapidly moving craft $\theta$ varies at a rate dependent on the easterly motion of the craft. For the present, assume that the instrument is to be mounted on a slowly moving craft so that $\theta$ is zero. Also, according to that patent application, the voltage energizing the torque motor is subtracted from the pickoff output and this difference voltage is proportional to the displacement of the pendulum reference plane from the true vertical. In Fig. 1, therefore, the output of the vertical sensing device 11, is proportional to the displacement of the pendulum reference plane from the true vertical. In Fig. 1, therefore, the output of the vertical sensing device 11 is proportional to the tilt of shafts 24, 25, out of the vertical in a direction perpendicular to the plane of azimuth frame 18 and the output of vertical sensing device 12 is proportional to the tilt of shafts 24, 25 out of the vertical in the plane of azimuth frame 18.

Assuming further that the azimuth frame 18 is aligned with the meridian, it will be seen that the angle between the frames 23 and 18 indicates the true target bearing, i.e., own course plus relative target bearing. In order to orient the azimuth frame 18 along the meridian, the obvious method requires computation of relative target bearing by means of a chain of four resolvers and a servo, and addition of own course thereto, to provide the true target bearing which is then fed to a synchro control transformer mounted between the level and azimuth frames 23 and 18. The output of the synchro control transformer could be used to energize a servo motor between the level and azimuth frames. In order to avoid this complex system, a roll reference gimbal or bail 60 is mounted with its supports 61, 62 in the fore and aft direction, and its pivots 63, 64 on a line which meets the intersection of the axes of shafts 31, 32 and 36, 37. A shaft 65 passes through the tubular shaft 25 and is terminated in one end at a carriage 66, which is slidably connected to the bail 60 and is terminated at the other end in gear 67, which through gearing 67a, is adapted to position the rotors of resolver 68 and synchro control transformer 69, the stators of which are attached to azimuth frame 18. Gearing 67a between gear 67 and the resolver 68 and control transformer 69 is merely representative and may in actuality contain idler gears for change of direction of relative motion between the rotors and stators if necessary.

The carriage 66 may include rollers 66a in contact with the bail 60 and located on either side of the bail as shown in Fig. 3. The rollers 66a, rotatable with respect to a supporting frame 65a, allow sliding freedom of the carriage 66 along the bail 60. The shaft 65 is rigidly attached to the supporting plate 65a under the bail 60 so as to prevent rotation of shaft 65 with respect to the carriage 66. Preferably there are two rollers on at least one side of the bail 60 to eliminate the possibility of rotation between the carriage 66 and bail 60. The device shown in Fig. 3 is merely illustrative and in no way does Fig. 3 pretend to show a complete mechanical detail of the carriage. Such details are well known to those in the art and innumerable acceptable designs can be completed without further illustration.

The roll reference bail 60 is oriented into the vertical plane by the shaft 65, since shaft 65 is coaxial with shaft 25. Therefore, since the pivots 63, 64 are in the fore and aft direction the carriage 66 is oriented into the vertical plane passing through a fore and aft axis of the craft. Since, by definition, the angle between the vertical plane containing the fore and aft axis of the craft and the vertical plane containing the geographical meridian is equal to the course of the craft, the angle between the shaft 65, which is maintained vertical and in the fore and aft plane by carriage 66 and the azimuth gimbal frame 18 is equal to own course, when gimbal frame 18 is aligned with the meridian.

The stator windings 70 of the control transformer 69 are energized according to own ship's course, $Co$, from a master compass (not shown). The rotor winding 71 of the control transformer 69 is connected to energize the control field winding 72 of motor 26, so that motor 26 drives the azimuth gimbal frame 18 until the signal output of the rotor winding 71 is zero whence the stator windings 70 are displaced with respect to the rotor windings 71 according to own ship's course. Thus, since the rotor winding 71 is directed in the fore and aft direction by its connection to shaft 65 through gearing 67a, and since the displacement between the rotor and stator windings 71, 70 is equal to own ship's course, the azimuth frame 18 must be directed along the meridian.

The stator winding 73 of resolver 68 is energized by a voltage proportional to own ship's speed. $So$, available from a speed indicator 76 such as a ship's log, for example. The rotor windings 74, 75 of resolver 68 are displaced with respect to the stator winding 73 according to $Co$ by gearing 67a. Thus, the voltage output of rotor winding 74 is proportional to $So \cos Co$ and the voltage output of rotor winding 75 is proportional to $So \sin Co$. These outputs are used to provide the required $So \sin Co$ signal to vertical sensing device 11 and the $So \cos Co$ signal to vertical sensing device 12 as previously assumed and for the purposes stated earlier. For any other desired orientation of frame 18, the signal $Co+\theta$, where $\theta$ is the displacement from true north may be applied to the stator windings 70 of the control transformer 69.

I claim:

1. In a device of the character described, an unstable platform having a fore and aft axis, a vertical spin axis gyroscope universally supported in an azimuth frame, a gimbal system supported from and rotatable with respect to said platform, a vertical level frame supported in said gimbal system by horizontal shafts aligned with a level axis, means for supporting said azimuth frame in said level frame for rotation about a vertical axis therein, a roll reference bail supported for rotation about said fore and aft axis, a carriage slidable relative to said bail, a shaft extending between said carriage and said azimuth frame and means operatively connected to said shaft and said frame for indicating the relative angular displacement therebetween.

2. In a device of the character described, an unstable platform having a fore and aft axis, a vertical spin axis gyroscope universally supported in an azimuth frame, vertical sensing means carried by said frame, a gimbal system supported from and rotatable with respect to said platform, a vertical level frame supported in said gimbal system by horizontal shafts aligned with a level axis, means for supporting said azimuth frame in said level frame for rotation about a vertical axis therein, a roll reference bail supported for rotation about said fore and aft axis, a carriage slidable relative to said bail, a shaft extending between said carriage and said azimuth frame and means operatively connected to said shaft and said frame for indicating the relative angular displacement therebetween, said vertical sensing means being adapted to maintain said spin axis in a vertical direction.

3. In a device of the character described, an unstable platform having a fore and aft axis, a vertical spin axis gyroscope universally supported in an azimuth frame, a gimbal system supported from and rotatable with respect to said platform, a vertical level frame supported in said gimbal system by horizontal shafts aligned with a level axis, means for supporting said azimuth frame in said level frame for rotation about a vertical axis therein, a roll reference bail supported for rotation about said fore and aft axis, a carriage slidable relative to said bail, a shaft extending between said carriage and said azimuth frame and means operatively connected to said shaft and said frame for indicating the relative angular displacement therebetween, and motive means for driving said azimuth frame and energized by said indicating means.

4. In a device of the character described, an unstable platform having a fore and aft axis, a vertical spin axis gyroscope universally supported in an azimuth frame, vertical sensing means carried by said frame, a gimbal system supported from and rotatable with respect to said platform, a vertical level frame supported in said gimbal system by horizontal shafts aligned with a level axis, means for supporting said azimuth frame in said level frame for rotation about a vertical axis therein, a roll reference bail supported for rotation about said fore and aft axis, a carriage slidable relative to said bail, a shaft extending between said carriage and said azimuth frame and means operatively connected to said shaft and said frame for indicating the relative angular displacement therebetween, said vertical sensing means being adapted to maintain said spin axis in a vertical direction, and motive means for driving said azimuth frame and energized by said indicating means.

5. In a device of the character described, an unstable platform having a fore and aft axis, a vertical indicator universally supported in an azimuth frame, a gimbal system supported from and rotatable with respect to said platform, a vertical level frame supported in said gimbal system by horizontal shafts aligned with a level axis, means for supporting said azimuth frame in said level frame for rotation about a vertical axis therein, a roll reference bail supported for rotation about said fore and aft axis, a carriage slidable relative to said bail, a shaft extending between said carriage and said azimuth frame and means operatively connected to said shaft and said frame for indicating the relative angular displacement therebetween.

6. In a device of the character described, an unstable platform having a fore and aft axis, a vertical indicator universally supported in an azimuth frame, a gimbal system supported from and rotatable with respect to said platform, a vertical level frame supported in said gimbal system by horizontal shafts aligned with a level axis, means for supporting said azimuth frame in said level frame for rotation about a vertical axis therein, a roll reference bail supported for rotation about said fore and aft axis, a carriage slidable relative to said bail, a shaft extending between said carriage and said azimuth frame and means operatively connected to said shaft and said frame for indicating the relative angular displacement therebetween, said vertical sensing means being adapted to maintain said vertical indicator in a vertical direction.

7. In a device of the character described, an unstable platform having a fore and aft axis, gimbal means supported by said platform, a first vertical frame suspended in said gimbal means, a second vertical frame rotatable in and supported by said first vertical frame about a vertical axis, a reference bail supported by said platform for rotation about said fore and aft axis, a carriage carried by and slidable relative to said bail but not rotatable with respect thereto, a shaft fixed to said carriage and extending between said carriage and said second vertical frame and colinear with said vertical axis and means operatively connected to said shaft and said second frame for indicating the relative angular displacement therebetween.

References Cited in the file of this patent

UNITED STATES PATENTS

| | | |
|---|---|---|
| 1,984,874 | Gillmor et al. | Dec. 18, 1934 |
| 2,048,834 | Young | July 28, 1936 |
| 2,411,087 | Ford et al. | Nov. 12, 1946 |
| 2,504,604 | Tear | Apr. 18, 1950 |